United States Patent [19]

Potter

[11] Patent Number: 5,832,630
[45] Date of Patent: Nov. 10, 1998

[54] BLADDER AND METHOD OF MAKING THE SAME

[75] Inventor: Daniel R. Potter, Tigard, Oreg.

[73] Assignee: Nike, Inc., Beaverton, Oreg.

[21] Appl. No.: 95,476

[22] Filed: Jul. 23, 1993

Related U.S. Application Data

[63] Continuation of Ser. No. 786,704, Nov. 1, 1991, abandoned.

[51] Int. Cl.$^6$ .................................................... A43B 13/20
[52] U.S. Cl. ............................ 36/29; 36/28; 36/43; 36/44
[58] Field of Search ................................ 36/28, 29, 35 B, 36/43, 44, 88, 93, 71, 153, 154, 3 B; 5/455, 449, 456; 428/178, 179, 166; 154/145, 147

[56] References Cited

U.S. PATENT DOCUMENTS

| | | |
|---|---|---|
| 900,867 | 10/1908 | Miller . |
| 1,069,001 | 7/1913 | Guy . |
| 1,304,915 | 5/1919 | Spinney . |
| 1,514,468 | 11/1924 | Schopf . |
| 1,625,582 | 4/1927 | Anderson . |
| 1,869,257 | 7/1932 | Hitzler . |
| 2,080,469 | 5/1937 | Gilbert . |
| 2,488,382 | 11/1949 | Davis . |
| 2,645,865 | 7/1953 | Town . |
| 2,677,906 | 5/1954 | Reed . |
| 2,715,231 | 8/1955 | Marston . |
| 3,030,640 | 4/1962 | Gosman . |
| 3,589,037 | 6/1971 | Gallagher ..................................... 36/44 |
| 3,758,964 | 9/1973 | Nishimura . |
| 4,017,931 | 4/1977 | Golden . |
| 4,115,934 | 9/1978 | Hall . |
| 4,129,951 | 12/1978 | Petrosky . |
| 4,183,156 | 1/1980 | Rudy . |
| 4,217,705 | 8/1980 | Donzis . |
| 4,297,797 | 11/1981 | Meyers . |
| 4,305,212 | 12/1981 | Coomer ....................................... 36/80 |
| 4,445,283 | 5/1984 | Meyers . |
| 4,446,634 | 5/1984 | Johnson et al. . |
| 4,670,995 | 6/1987 | Huang . |
| 4,722,131 | 2/1988 | Huang . |
| 4,912,861 | 4/1990 | Huang . |
| 4,991,317 | 2/1991 | Lakic . |
| 5,025,575 | 6/1991 | Lakic . |
| 5,179,792 | 1/1993 | Brantingham . |

FOREIGN PATENT DOCUMENTS

| | | |
|---|---|---|
| 81605 | 10/1986 | Taiwan . |
| 123336 | 3/1990 | Taiwan . |
| 134162 | 9/1990 | Taiwan . |
| 160500 | 6/1991 | Taiwan . |
| 173484 | 11/1991 | Taiwan . |
| 184346 | 5/1992 | Taiwan . |
| 89/10074 | 11/1989 | WIPO . |

OTHER PUBLICATIONS

Unstable Air Has Been Known to Do Some Serious Damage; Etonic; Feb. 1990; 147 Centre Street, Brockton MA 02402.

*Primary Examiner*—Paul T. Sewell
*Attorney, Agent, or Firm*—Banner & Witcoff Ltd

[57] ABSTRACT

A bladder usable in the sole of a shoe for supporting the plantar area includes a plurality of chambers designed to provide a resilient resistance force. In the fabrication of the bladder, each of the chambers is formed in fluid communication with each other, and fluid is supplied into the chambers at a selected location. After the chambers have been pressurized to the desired internal pressure, the fluid communication port(s) is sealed. Although certain of the chambers are pressurized to the same internal pressure, different resistance forces are provided by forming the chambers with different volumes.

7 Claims, 8 Drawing Sheets

BLADDER AND METHOD OF MAKING THE SAME

This application is a continuation of application Ser. No. 07/786,704, filed Nov. 1, 1991, now abandoned.

BACKGROUND OF THE INVENTION

The present invention pertains to a bladder, having particular usefulness in the sole of a shoe, and a method for making the same.

Bladders have long been used in shoes as a cushion to increase shoe comfort, enhance foot support, reduce the risk of injury and other deleterious effects, and decrease fatigue. In general, the bladders are comprised of elastomeric materials which are shaped to define at least one pressurized pocket or chamber. Typically, a bladder will actually define many chambers arranged in a pattern designed to achieve one or more of the above-stated objectives. The chambers may be pressurized with a number of different mediums, such as air, various gases, water, or other liquids.

Many different chamber configurations have been developed in an effort to achieve the desired results. For instance, bladders have been constructed with a single chamber that extends over the entire area of the sole. One example of this type of bladder is disclosed in U.S. Pat. No. 2,080,469 to Gilbert, entitled "Pneumatic Foot Support." Alternatively, bladders have included a number of chambers fluidly interconnected with one another. Examples of these types of bladders are disclosed in U.S. Pat. No. 4,183,156 to Rudy, entitled "Insole Construction For Articles of Footwear," and U.S. Pat. No. 900,867 to Miller, entitled "Cushion for Footwear." However, these type of bladder constructions have been known to flatten and "bottom out" when they receive high impact pressures, such as experienced in athletic activities. Such failures negate the intended benefits of providing the bladder.

In an effort to overcome this problem, bladders have been developed wherein the chambers are fluidly connected by restricted openings. Examples of these bladders are illustrated in U.S. Pat. No. 4,217,705 to Donzis, entitled "Self-contained Fluid Pressure Foot Support Device," U.S. Pat. No. 4,129,951 to Petrosky, entitled "Air Cushion Shoe Base." and U.S. Pat. No. 1,304,915 to Spinney, entitled "Pneumatic Insole." These bladders, however, have tended to either be ineffective in overcoming the deficiencies of the non-restricted bladders or have been too expensive to manufacture.

Additionally, artisans have developed shoe bladders which include a number of separate chambers that are independent of one another. In other words, the chambers are not fluidly connected. Hence, the fluid contained in any one chamber is precluded from passing into another chamber. One example of this construction is disclosed in U.S. Pat. No. 2,677,906 to Reed, entitled "Cushioned Inner Sole For Shoes and Method of Making the Same." Although this design obviates "bottoming out" of the bladder, it also requires each chamber to be individually pressurized. Thus, the cost of production has been exceedingly high.

Another shoe bladder manufactured by Etonic also includes a plurality of discrete chambers which lack fluid interconnection. The chambers are, however, all formed at ambient pressure. This construction obviates the need to individually pressurize each chamber and thus results in less manufacturing costs. However, the use of chambers pressurized above ambient pressure is not possible. As a result, the versatility and potential gain from using the bladder is reduced.

Attempts have further been made to design the bladders to suit specific needs. For example, the support and cushion needed for jogging would be different than that needed for aerobics. In bladders having either restricted connections between chambers or independent chambers, artisans have sought to differentiate the pressures in the various chambers depending on the part of the plantar surface to be supported and the activity to be engaged. Examples of this practice include U.S. Pat. No. 4,445,283 to Meyers, entitled "Footwear Sole Member," the '705 patent to Donzis, the '906 patent to Reed, the '951 patent to Petrosky, and the '915 patent to Spinney. These approaches, however, have not been entirely successful. With respect to the restricted flow bladders, the results have had only limited success in actually providing the desired differences in pressure. Although the independent bladders effectively provide different pressures at various points across the sole, the cost to manufacture the bladders has been prohibitively high. As illustrated in FIGS. 3 and 7 in the '906 patent to Reed, each independent chamber must be individually pressurized. As can be readily appreciated, this process is not suitable for mass production, particularly in bladders having a significant number of chambers.

SUMMARY OF THE INVENTION

The aforementioned problems are overcome in the present invention, wherein a bladder having a unique independent chamber construction can be manufactured without the heretofore high attendant costs.

More specifically, a bladder in accordance with the present invention is particularly useful in the sole of a shoe. The bladder includes a plurality of chambers which are strategically arranged under specific areas of the plantar surface. The chambers are pressurized to a certain internal pressure. Nevertheless, because the chambers define differing volumes of pressurized fluid, each of the chambers are capable of providing a unique resistance. This capacity enables the bladders to provide the desired support and cushion to any particular portion of the foot. Thus, the bladder may be specially adapted to accommodate a particular activity.

In addition, by practicing the method of the present invention, a bladder with these characteristics, can be fabricated quickly, easily, and at a low cost. The method involves selectively forming a number of chambers with an elastomeric material, such that each chamber is in fluid communication with the others. Thereafter, the interior of the product is supplied with an amount of fluid, so that the chambers are all pressurized at the same desired level. The fluid communication is then sealed so that each of the chambers is separated from the other chambers.

As another aspect of the invention, certain portions of the bladder can be pressurized to different levels. In this process, a first set of chambers are formed in fluid communication with each other; and a separate second set of chambers are formed in fluid communication with each other. The first set is not in fluid communication with the second set. These two discrete portions are then each supplied with a quantity of fluid so that each set of chambers is pressurized at a different level. Thereafter, the fluid communications are sealed so that each chamber is separated from the other chambers.

As can be readily appreciated, the practice of either aspect of the inventive process facilitates the manufacture of a bladder having the above-described desirable characteristics in a manner which eliminates the difficulties experienced in the past. Specifically, a bladder having independent chambers that each provide a unique resistance, can be made without having to individually pressurize each chamber. Further, the process is quick, easy, and economical.

These and other objects, advantages, and features of the present invention will be more fully understood and appreciated by reference to the specification and appended drawings.

DETAILED DESCRIPTION OF THE PREFERRED EMBODIMENT

Figure 4:
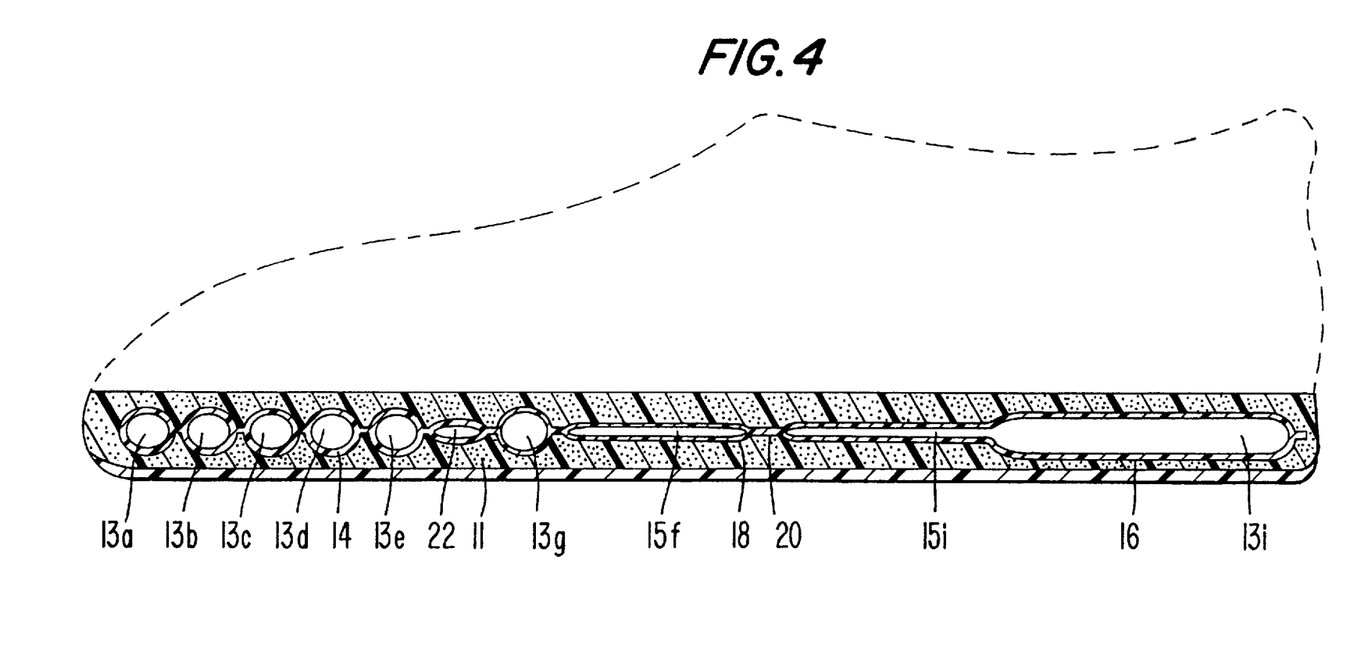
FIG. 4 is a cross-sectional view of the bladder shown in FIG. 1a contained within a midsole of a shoe.

In a preferred embodiment of the invention (FIGS. 1 and 1a), a bladder 10 is a thin, elastomeric member defining a plurality of chambers or pockets 12. The chambers are pressurized to provide a resilient support. Bladder 10 is particularly adapted for use in the midsole of the shoe, but could be included in other parts of the sole or have applicability in other fields of endeavor. In a midsole, bladder 10 would preferably be encapsulated in an elastomeric foam 11 (FIG. 4). As is well known in the art, the foam need not fully encapsulate the bladder. Moreover, the bladder can be used to form the entire midsole or sole member.

Figure 1:
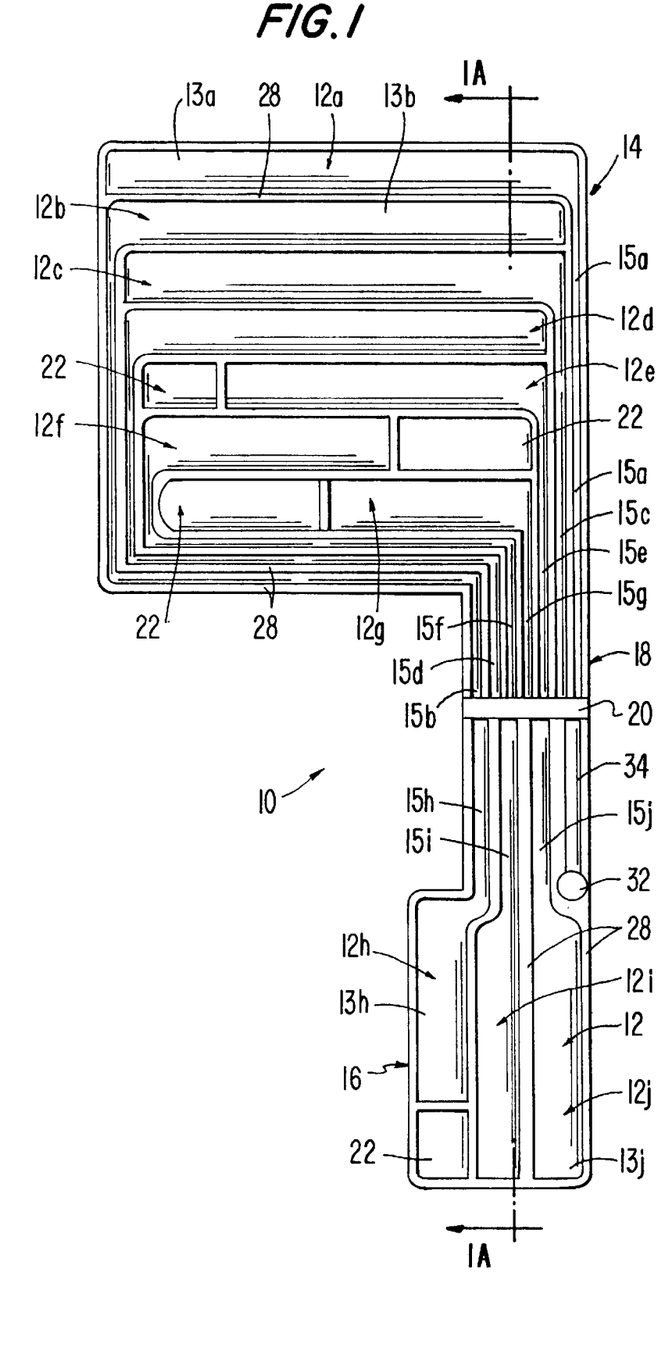
FIG. 1 is a top plan view of a bladder of the present invention.
Figure 1A:
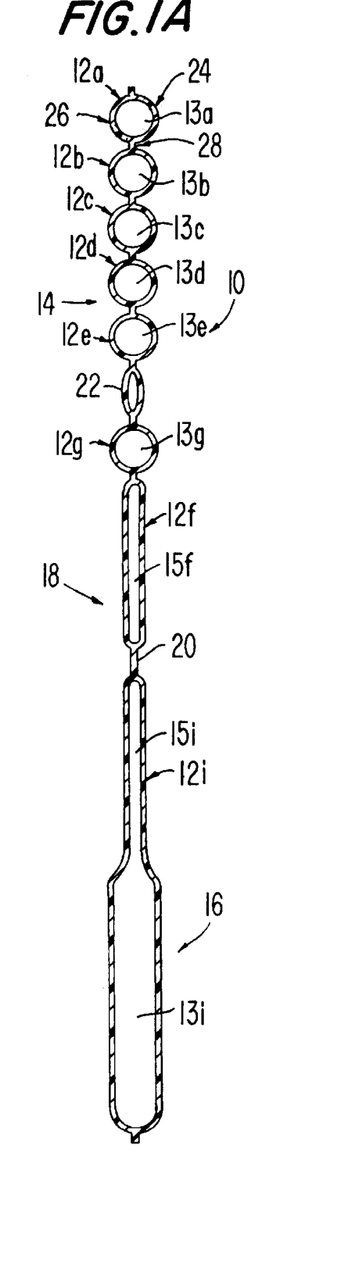
FIG. 1a is a cross-sectional view taken along line 1a—1a in FIG. 1.

Preferably, bladder 10 is composed of a resilient, plastic material such as a cast or extruded ester base polyurethane film having a shore "A" hardness of 80 to 95 (e.g., Tetra Plastics TPW-250) which is inflated with hexafluorethane (e.g., Dupont F-116) or sulfur hexafluoride. However, other materials and fluids having the requisite characteristics, such as those disclosed in U.S. Pat. No. 4,183,156 to Rudy, could also be used. Further, the bladders can also be fabricated by blow molding or vacuum forming techniques.

As a bladder midsole, bladder 10 defines a forefoot support 14, a heel support 16, and a medial segment 18 interconnecting the two supports. Chambers 12 each define a support portion 13 and a channel portion 15. The support portions 13 are raised to provide a resilient resistance force for an individuals foot. The channel portions 15 are relatively narrow in comparison to support portions 13, and are provided to facilitate the unique manufacturing process described below. Forefoot and heel supports 14, 16 are comprised primarily of support portions 13 so that a cushioned support is provided under the plantar areas receiving the greatest impact pressure during use of the shoe. Channel portions 15, while extending partially into the forefoot and heel supports 14, 16, are concentrated in medial segment 18.

In forefoot support 14, the support portions 13 are arranged parallel to one another in a lateral direction across the sole to provide a suitable flexibility in the forefront sole portion and to apportion the cushioned resistance as desired. Nonetheless, different chamber arrangements could be used.

In the illustrated athletic shoe, forefoot portion 14 includes chambers 12a–g. Chambers 12a–g are of varying sizes, with the chambers nearer to the front (e.g., chamber 12a) defining a larger volume than those closer to medial segment 18 (e.g., chamber 12g). As will be described more fully below, all of the chambers 12a–g are pressurized to the same level. However, due to the different volumes of the chambers, they will each possess a unique resistance. In other words, the chambers with smaller volumes will provide a firmer support than the chambers with larger volumes, because the movement of a side wall defining a smaller chamber will involve a greater percentage of the volume of air being displaced than the same movement in a larger chamber. Hence, for example, chamber 12g will provide a firmer support than chamber 12a.

Channel portions 15a–g of chambers 12a–g, in general, extend rearwardly from support portions 13a–g to a seal 20 located transversely across medial segment 18. Channel portions 15 are essential to the unique manufacturing process described below. Preferably, channel portions 15 are provided along the sides of forefoot portion 14, so that the needed cushioned support is not taken from the central portions of the sole where it is most needed. In the illustrated embodiment, channel portions 15 for adjacent chambers 12 are placed on opposite sides of the sole. Of course, other arrangements could be used.

Additionally, in forefoot portion 14, void chambers 22 are defined adjacent the more rearward chambers 12e–g. A void chamber 22 is a chamber that has not been pressurized. Void chambers 22 exist because of the need to limit the volume of chambers 12e–g to provide a certain firmness in these portions of the bladder. Nevertheless, void spaces are not essential to the present invention and could be eliminated. In a midsole usage (FIG. 4) the resilient foam 11 would fill in the void space and provide ample support to the user's foot.

In a manner similar to forefoot support 14, heel support 16 includes a row of chambers 12h–j. In the illustrated bladder, three chambers 12h–j are provided. The support portions 13h–j of these chambers are arranged parallel to one another in a generally longitudinal direction across the sole to ensure that all three chambers provide cushioned support for all impacts to the user's heel. Nonetheless, as with the forefoot portion, different chamber arrangements could be used. Additionally, each chamber 12h–j includes a channel portion 15 which extends from the support portion 13 to seal 20. In the same manner as in forefoot support 14, chambers 12h–j provide different resistance forces in the support of the heel. For example, the smaller chamber 12h will provide a firmer resistance than the larger chambers 12i or 12j. The firmer chamber 12h would act as a medial post in reducing pronation.

In the first embodiment of the invention (FIG. 1), chambers 12h–j are pressurized to the same internal pressure as chambers 12a–g. One preferred example of internal pressure for athletic footwear is 30 psi. Of course, a wide variety of other pressures could be used. In an alternative embodiment of the invention (FIG. 3), chambers 112h–j are pressurized to a different internal pressure than chambers 112a–g. As one preferred example, the pressure in the forefoot portion could be set at 35 psi, while the heel portion could be pressurized to 30 psi. The particular pressure in each section though will depend on the intended activity and the size of the chambers, and could vary widely from the given examples.

Figure 2:
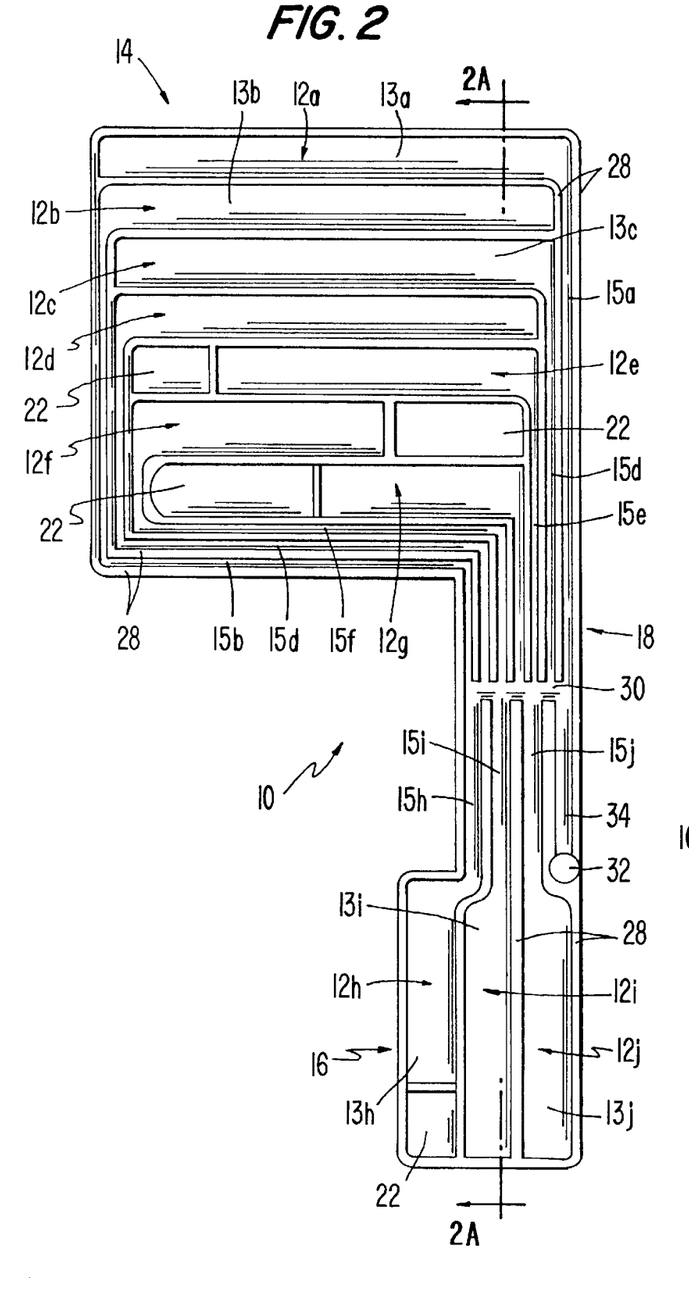
FIG. 2 is a top plan view of a bladder of the present invention at an interim stage of its fabrication.
Figure 2A:
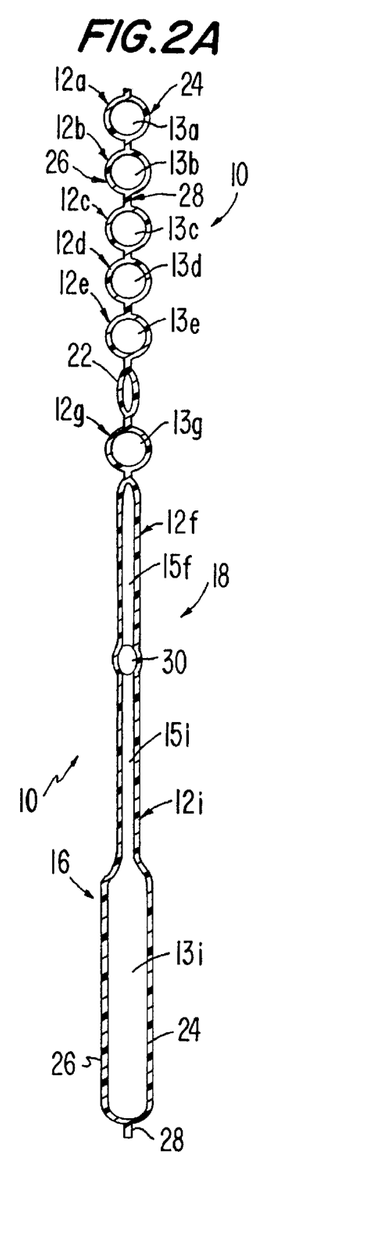
FIG. 2a is a cross-sectional view taken along line 2a—2a in FIG. 2.

In the fabrication of bladder 10, two elastomeric sheets 24, 26 are preferably secured together to define the particular weld pattern illustrated in FIG. 2; that is, that the two opposed sheets 24, 26 are sealed together to define wall segments 28 arranged in a specific pattern (FIG. 2a). The welding is preferably performed through the use of radio frequency welding, the process of which is well known. Of course, other methods of sealing the sheets could be used. Alternatively, the bladder could also be made by blow molding or injection molding, the processes of which are also well known.

When the bladder is initially welded (or otherwise formed), a common area 30 is defined at the location where seal 20 is formed (FIG. 2). Common area 30 is fluidly coupled with all of the channel portions 15 of chambers 12a–j, so that all of the chambers are in fluid communication with one another.

An injection pocket 32 is provided to supply bladder 10 with a quantity of fluid. Injection pocket 32 is in fluid communication with a pressurizing channel 34, which, in turn, is fluidly coupled to common area 30 (FIGS. 2 and 2a). Chambers 12a–j, therefore, are pressurized by inserting a needle (not shown) through one of the walls 24, 26 defining injection pocket 32, and injecting a pressurized fluid therein. The pressurized fluid flows from pocket 32, through channel 34, into common area 30, through channel portions 15a–j and into the supporting portions 13a–j of all of the chambers 12a–j. Once the predetermined quantity of fluid has been inserted into the bladder, or alternatively when the desired pressure has been reached, channel 34 is temporarily clamped.

Walls 24, 26 are welded, or otherwise heat sealed, forming seal 20 (FIG. 1) to completely close common area 30 so that none of the chambers are in fluid communication with any of the other chambers. Although, it may in certain circumstances be desirable to provide interconnecting ports in other portions of the sidewalls of selected chambers. Once sealing weld 20 has been made, the needle is removed and channel 34 remains an uninflated void area. Hence, as can be readily appreciated, this unique independent chamber design can be fabricated by the novel process in an easy, quick, and economical manner.

The fabrication of a second embodiment (FIG. 3) is similar to that of the first embodiment (FIG. 1). In particular, bladder 110 defines a forefoot support 114, a heel support 116, and a medial segment 118. The forefoot and heel supports 114, 116 each include a plurality of chambers 112. Specifically, forefoot support 114 includes chambers 112a–g and heel support 116 includes chambers 112h–j. Similarly, each chamber 112 includes a support portion 113 and a channel portion 115. Void chambers 122 are also provided to achieve the desired firmness in chambers 112e–g and 112h.

Figure 3:
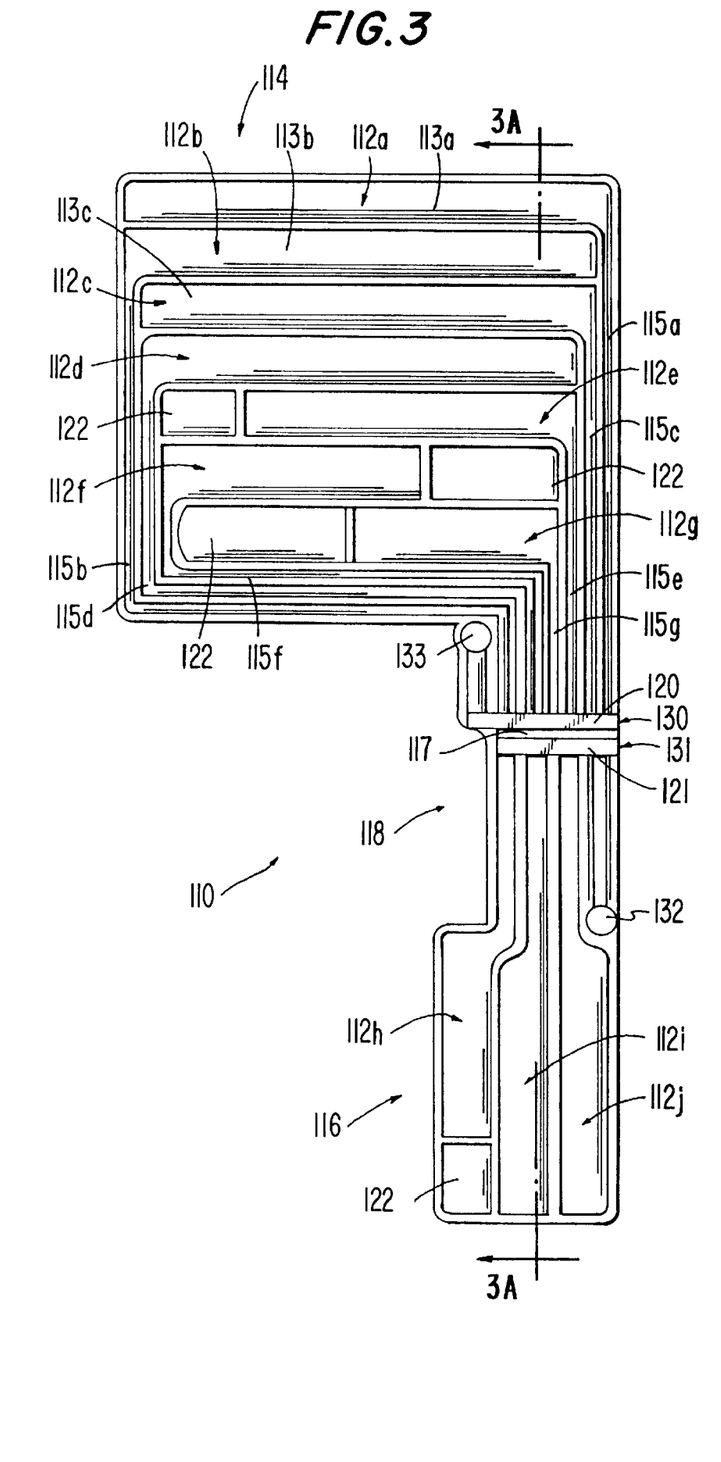
FIG. 3 is a top plan view of a second embodiment of a bladder of the present invention.
Figure 3A:
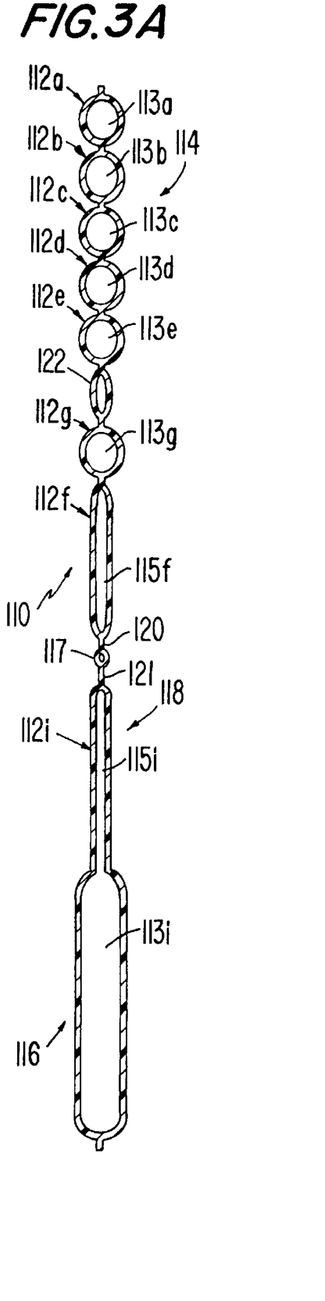
FIG. 3a is a cross-sectional view taken along line 3a—3a in FIG. 3.

In contrast to the first embodiment, forefoot support 114 and heel support 116 are divided by a sealing wall 117 across medial segment 118 prior to the supply of any pressurized fluid. In addition, a common area 130, 131 is defined immediately adjacent each side of the sealing wall 117. Common area 130 is in fluid communication with channels 115a–g, and common area 131 is in fluid communication with channels 115h–j.

In the fabrication of bladder 110, a needle (not shown) is inserted into each injection pocket 132, 133. In practice, two separate needles are preferably used, although one needle can be successively employed to inject fluid into each support 114, 116 if desired. By providing two separate injection pockets 132, 134 and sealing wall 117, different pressure levels may be supplied into the two separated forefoot and heel supports 114, 116. For instance, forefoot support 114 may be provided with a greater pressure (e.g., 35 psi) than the pressure (e.g., 30 psi) in heel support 116, to meet the specific resistance desired for the intended use of the shoe. Of course, the heel support could be provided with a greater pressure than the forefoot support if desired.

Once all of the chambers have been fully pressurized, the two common areas 130, 131 are then welded (or otherwise heat sealed) to form seals 120, 121. Seals 120, 121 function to close the fluid communication between the chambers so that each chamber is independent and separate from the remaining chambers. Once the seals have been formed the needles can be removed and injection pockets 132, 134 become uninflated void areas.

Figure 5:
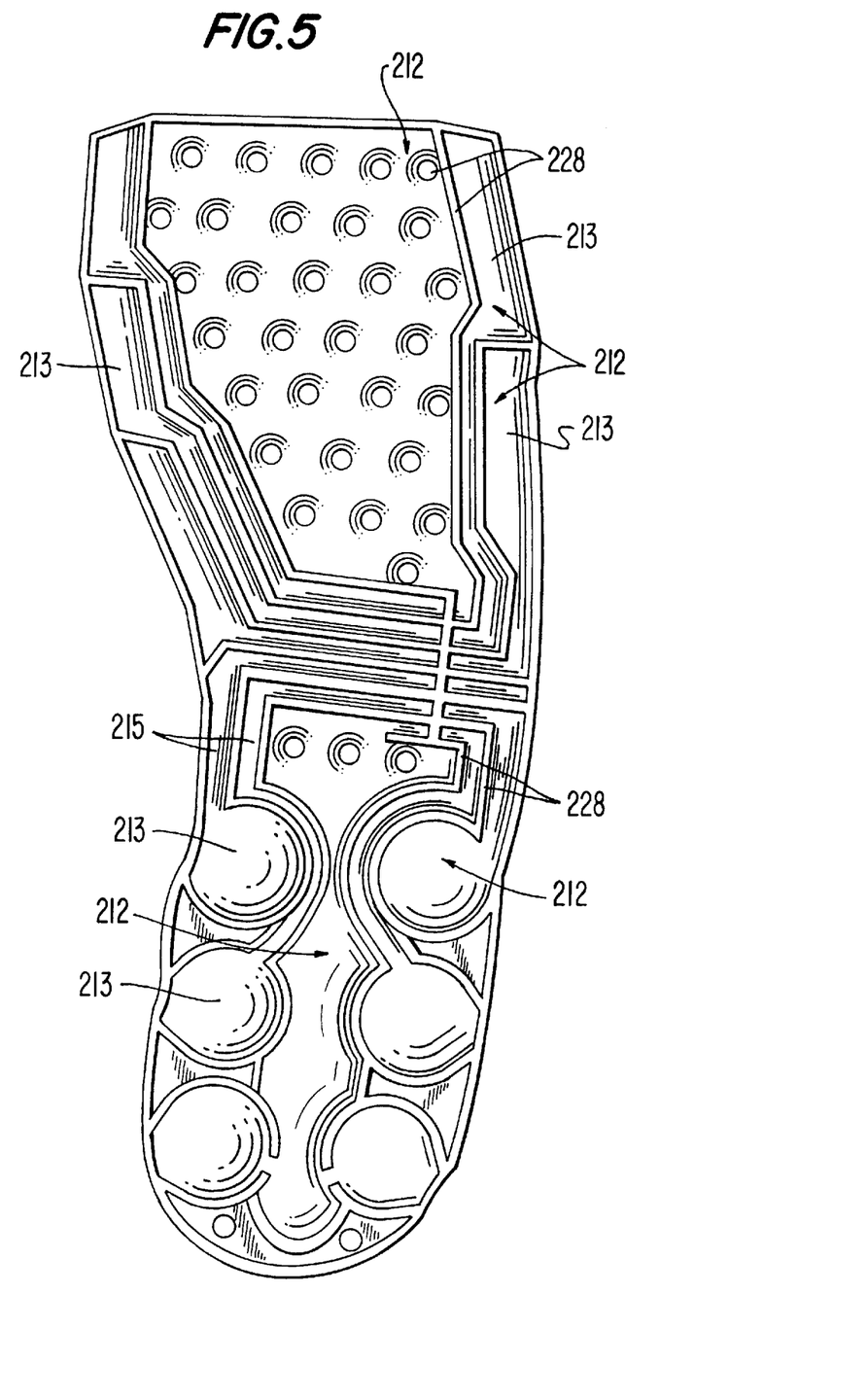
FIG. 5 is a top plan view of a third embodiment of the present invention.
Figure 6:
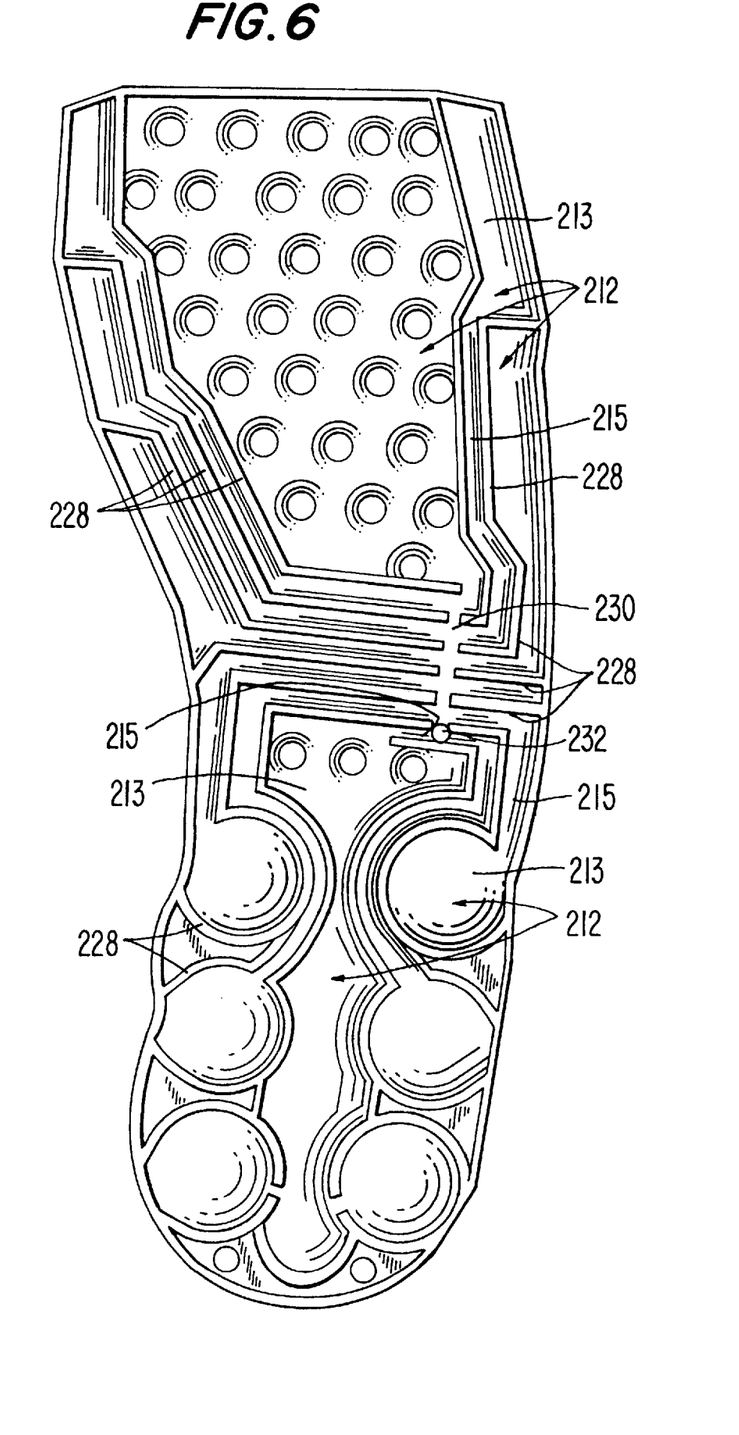
FIG. 6 is a top plan view of the third embodiment at an interim stage of its fabrication.

As can be appreciated, many different chamber configurations are possible. See for instance, FIG. 5 which includes a significantly different weldment pattern 228 defining a plurality a chambers 212. Like the earlier embodiments, the chambers 212 each includes a support portion 213 and a channel portion 215. The channel portions all fluidly interconnect the support portions 213 with a common area 230 (FIG. 6). Once the chambers have been pressurized by inserting a pressurizing needle in pocket 232, the common area is sealed so that each chamber is separated from the other chamber (FIG. 5).

Figure 7:
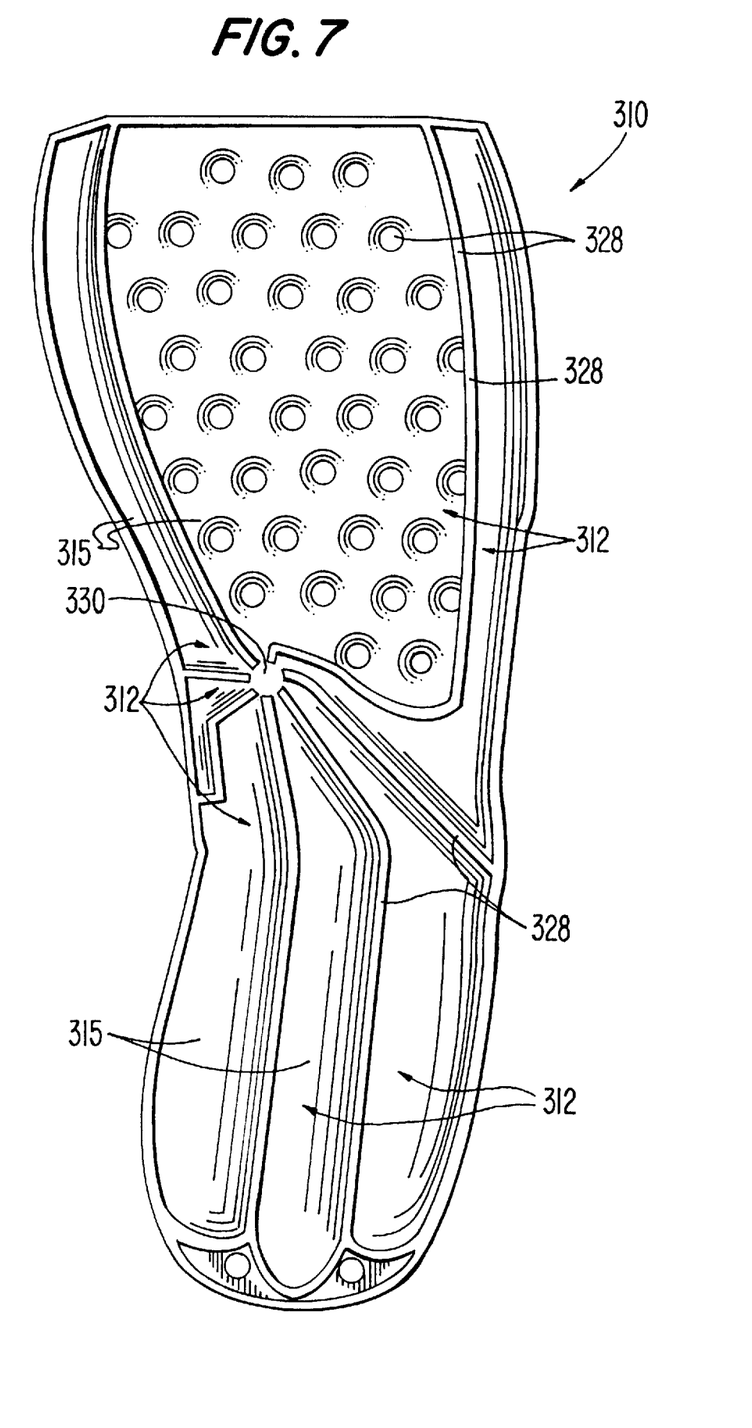
FIG. 7 is a top plan view of a fourth embodiment of the present invention at an interim stage in its fabrication.

In another embodiment (FIG. 7), the bladder 310 is designed such that the channel portions are eliminated. More specifically, bladder 310 is formed by a weldment pattern 328 defining a plurality of chambers 312 comprised solely of support portions 315. The chambers are initially all fluidly interconnected via common area 330. Once the bladder has been fully pressurized, the common area 330 is sealed off to eliminate the fluid interconnection between the chambers (not shown).

Figures 8, 8A, 8B:
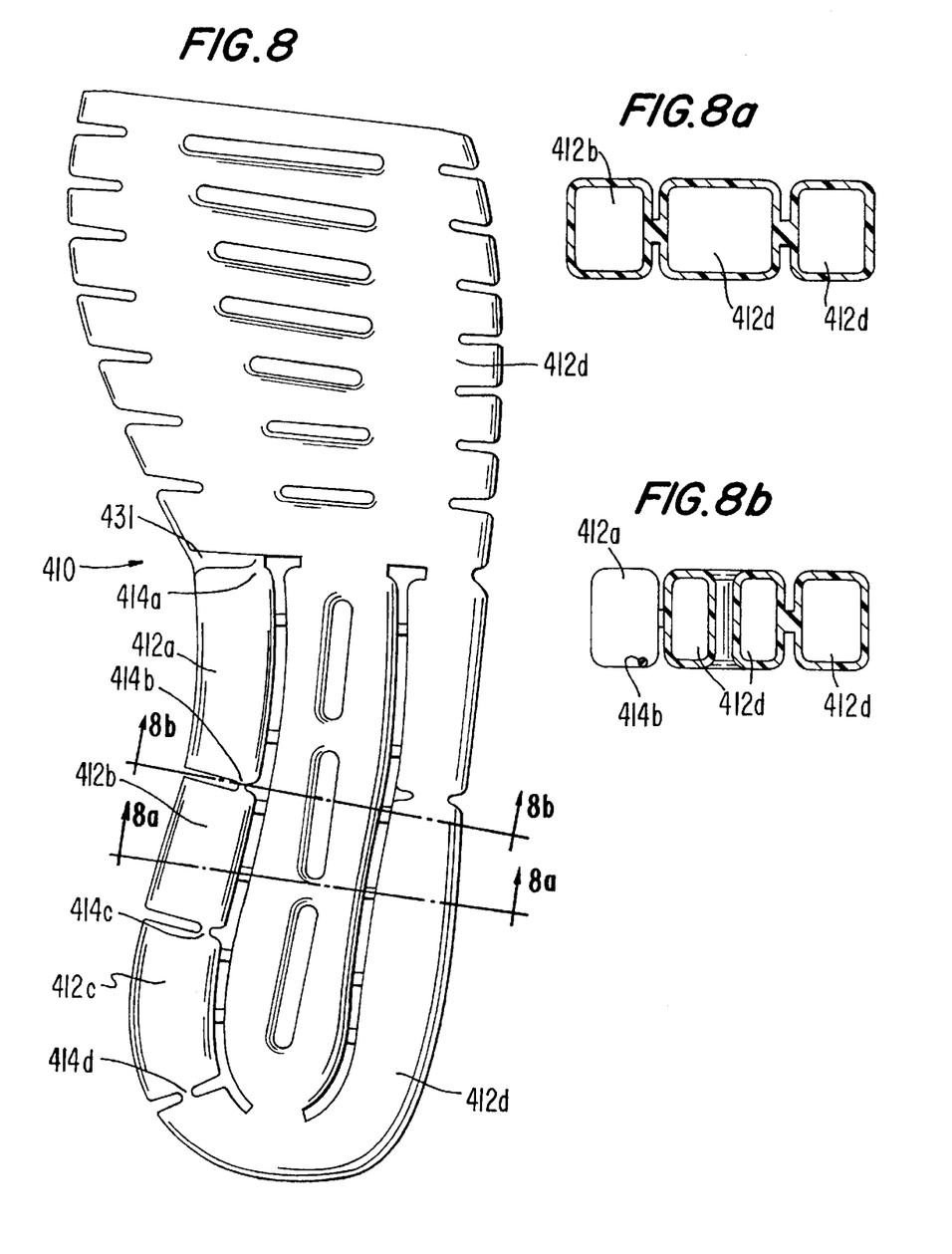
FIG. 8 is a top plan view of a fifth embodiment of the present invention at an interim stage of its fabrication.
FIG. 8a is a cross-sectional view taken along line 8a—8a in FIG. 8.
FIG. 8b is a cross-sectional view taken along line 8b—8b in FIG. 8.

FIG. 8 illustrates a bladder 410 which has been blow molded. In this embodiment, a plurality of chambers 412a–d are arranged into a unique pattern. The chambers are fluidly interconnected by ports 414b–d. Of course other patterns of chambers and ports could be used. In any event, this embodiment does not include a common area to which each chamber is joined. Rather, the chambers 412 are sequentially interconnected.

Once the chambers have been formed, a needle is inserted into the side of pocket 431 to pressurize the chambers. As can be readily appreciated, the chambers 412 are pressurized by the fluid passing sequentially through chambers 412a–d and ports 414a–d. When the fluid injection is complete, the ports 414a–d are sealed to separate the chambers from one another (not shown). The sealing process is preferably formed in a single step by a specially configured die.

The above description is that of preferred embodiments of the invention. Various alterations and changes may be made without departing from the spirit and broader aspects of the invention as set forth in the appended claims, which are to be interpreted in accordance with the principles of patent law including the doctrine of equivalents.

The embodiments of the invention in which an exclusive property or privilege is claimed is defined as follows:

1. A method of making a shoe sole comprising the steps of:

forming a bladder having opposing surfaces from elastomeric material, the bladder formed to include a partition separating the bladder into first and second sections, the partition preventing fluid interconnection between the sections, each of the sections including two chambers, each chamber in each section fluidly interconnected with the other chamber in the same section at a common area;

supplying fluid to the first section, the fluid flowing through the common area of the first section and pressurizing each chamber of the first section to a first pressure;

supplying fluid to the second section, the fluid flowing through the common area of the second section and pressurizing each chamber of the second section to a second pressure which is different than the first pressure;

sealing the common areas in each section to prevent passage of the fluid therethrough so that each chamber in each section is closed to the other chamber of the same section.

2. The method recited in claim 1, wherein, the step of forming includes forming one of the chambers of each section to have a different volume from the other chamber of the same section.

3. The method recited in claim 1, the partition formed to extend transversely across the bladder and to divide the bladder into forefoot and rearfoot areas, the first section formed in the forefoot area and the second section formed in the rearfoot area.

4. The method recited in claim 1, each said chamber formed to include a raised support portion and a channel portion.

5. The method recited in claim 1 comprising the further step of covering at least a portion of the bladder with an elastomeric foam material.

6. The method recited in claim 1, the chambers pressurized by the fluid to a level above ambient pressure.

7. The method recited in claim 1, the surfaces joined by welding.

* * * * *